Oct. 25, 1932.  J. F. PETERS  1,884,842
CAN BODY SOLDERING APPARATUS
Filed May 6, 1929  2 Sheets-Sheet 1
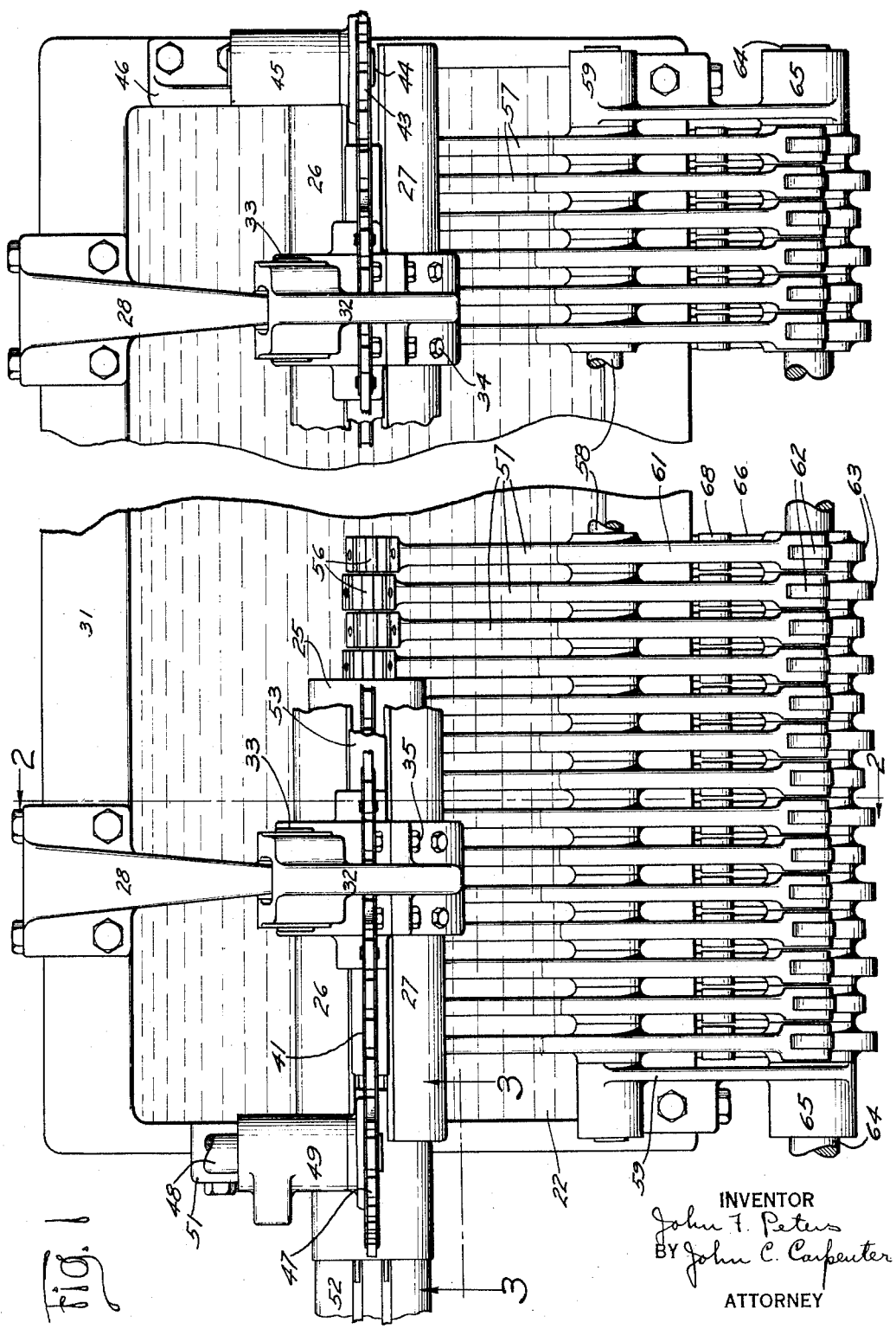

Oct. 25, 1932.  J. F. PETERS  1,884,842
CAN BODY SOLDERING APPARATUS
Filed May 6, 1929  2 Sheets-Sheet 2
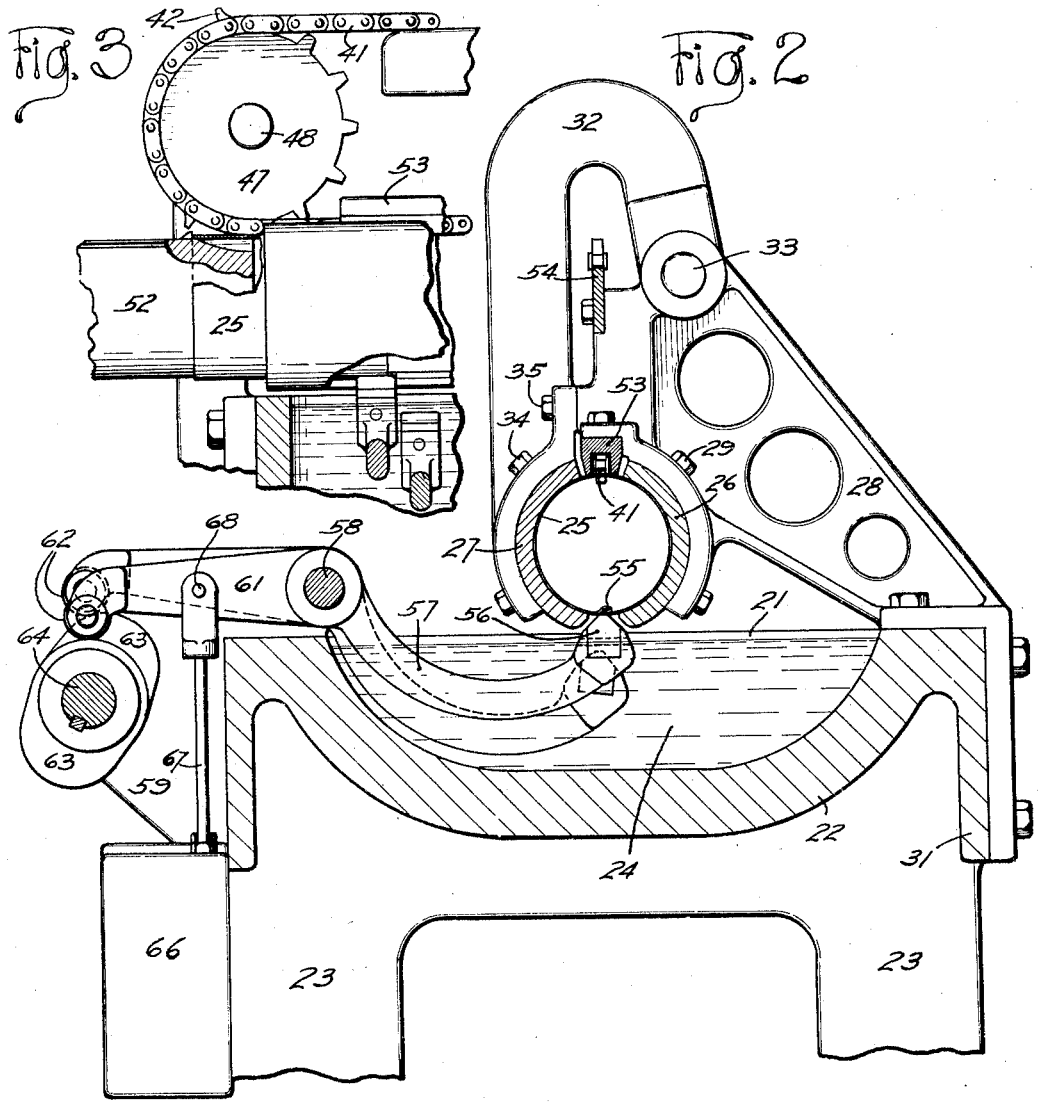
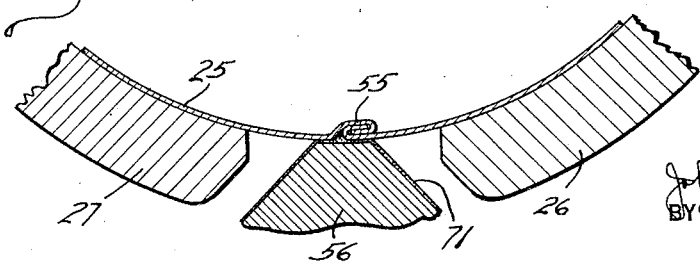
INVENTOR
John F. Peters
BY John C. Carpenter
ATTORNEY Patented Oct. 25, 1932

1,884,842

UNITED STATES PATENT OFFICE

JOHN F. PETERS, OF LEONIA, NEW JERSEY, ASSIGNOR TO AMERICAN CAN COMPANY, OF NEW YORK, N. Y., A CORPORATION OF NEW JERSEY

CAN BODY SOLDERING APPARATUS

Application filed May 6, 1929. Serial No. 360,651.

The present invention relates to a soldering apparatus and has particular reference to an improved device for soldering the side seam of can bodies.

The principal object of the present invention is the provision of a soldering apparatus embodying a series of solder irons arranged one after the other along the path of the can seam, which irons dip into a solder bath and which upon being lifted from the bath apply solder directly to the side seam of a can body as the same is conveyed over the solder bath.

A further important object of the invention relates to a plurality of solder irons positioned adjacent each other, the arrangement of irons extending in a straight line parallel to the line of travel of a can body and seam being soldered, each solder iron being individually movable for immersion within the solder of the solder bath and for lifting into soldering contact with the can body to apply the solder thereto.

An important object of the invention is the provision of a series of levers, each lever carrying a solder iron, the different levers and irons being positioned adjacent each other and extending practically in a continuous line, each lever being individually moved by cam action to raise its solder iron from the solder bath into soldering position.

An important object of the invention is the provision of a series of solder irons, each iron being mounted on a lever which is normally moved in a predetermined time cycle to raise its solder iron into soldering position, the connection between the lever and its actuating member being such as to permit abnormal movement of a lever at a different period of time should the work being soldered be in an abnormal condition.

Numerous other objects and advantages of the invention will be apparent as it is better understood from the following description, which, taken in connection with the accompanying drawings, discloses a preferred embodiment thereof.

Referring to the drawings:

Figure 1 is a top plan of a solder bath embodying the present invention, parts being broken away.

Fig. 2 is a transverse sectional view taken substantially along line 2—2 in Fig. 1.

Fig. 3 is a fragmentary sectional view taken substantially along the line 3—3 in Fig. 1, parts being shown in elevation and parts being broken away.

Fig. 4 is an enlarged sectional view of a fragment of a can body, solder horn and solder iron during a soldering operation.

The apparatus of the present invention is illustrated in connection with a solder bath type of soldering apparatus wherein a quantity of molten solder is carried in the bath and can bodies to be soldered are conveyed above and across the solder bath. A quantity of molten solder is applied by the solder irons to the side seam of a can body being conveyed by a conveyor chain along a supporting horn mounted on the solder bath. The solder irons are carried on levers which have pivotal movement relative to the solder bath and each lever is individually moved about its pivot by a cam carried on a cam shaft mounted on one side of the solder bath. The soldering operation, therefore, is accompanied by a pivoting of a lever which action raises its solder iron from the solder within the bath and moves it into contact with the side seam of the can body being conveyed along the horn. The cam control for this movement of the levers operates in connection with a weight attached to each lever, this permitting the depression of an individual soldering iron in the event of a misalignment, mutilation or other abnormal condition of a can body being soldered.

A solder bath 21 (Figs. 1 and 2) may comprise a solder receptacle 22 formed in a suitable supporting frame 23 and adapted to contain solder 24. Such solder is maintained in a molten condition for soldering in any usual or preferred manner. A solder horn is provided for supporting can bodies 25 as they are conveyed over the solder bath 21, this horn comprising a pair of guide rails 26 and 27 forming a pass for the can body 25. Rail 26 is preferably carried by brackets 28 connection being made by bolts 29, brackets 28 being, in turn, bolted to side walls 31 of the solder bath.

Rail 27 may be carried by brackets 32 mounted upon pivots 33 carried by the brackets 28, bolts 34 securing rail 27 to its brackets. This construction permits hinging movement of the brackets 32 to remove the rail 27 from its normal position adjacent rail 26 to permit access to the can body 25. The interior of the rails 26 and 27 are, at such a time, exposed for the purpose of removing can bodies 25 or for inspecting the inner faces of the rails. Bolts 35 are used to hold each bracket 32 in its normal connected position with its associated bracket 28 and to hold rail 27 in can body supporting position.

The can bodies 25 are conveyed along the horn by an endless chain conveyor 41 provided with a series of spaced flights 42 for engaging the can bodies, the chain operating over an idler sprocket 43 mounted on a shaft 44 journaled in a bearing 45 carried by a bracket 46 bolted to one side wall 31 of the solder bath 21. Conveyor chain 41, also, operates over a sprocket 47 secured to a drive shaft 48 journaled in a bearing 49 formed in a bracket 51 bolted to one side wall 31 of the solder bath 21. Drive shaft 48 may be suitably rotated in the usual or preferred manner to move conveyor chain 41 in synchronism with the rest of the machine.

Can bodies 25 may be brought into the apparatus from a can body forming machine having the usual forming horn 52. These can bodies 25 are transferred from the horn 52 into the solder horn of the present apparatus where they are confined within the guide rails 26 and 27 and moved therealong by engagement of one of the flights 42 of the continuously moving conveyor chain 41. Chain 41 at its lower run passes along a guide-way formed in a channel iron 53 supported by the brackets 28 and at its upper or return run this chain passes along the upper surface of a rail 54 bolted to and supported by the brackets 28.

During its passage along the solder horn container body 25 is held with its side seam 55 at the bottom of the horn, this side seam passing along the space between the lower ends of guide rails 26 and 27. While passing along this space the side seam 55 is engaged by solder irons and solder is applied thereto (see Fig. 4).

A plurality of solder irons 56 (Figs. 1 and 2) are positioned beneath the solder horn and each solder iron is carried in the forward end of a lever 57 pivoted on a horizontal shaft 58 supported at each end by brackets 59 bolted to opposite side walls 31 of the solder bath 21. Each lever 57 is provided with an arm 61 which carries a cam following roller 62 positioned above and held in engagement with a cam 63 keyed to a cam shaft 64 rotating within bearings 65, formed in brackets 59. Shaft 64 is rotated in synchronism with the moving of the conveyor chain 41 in any suitable manner. A weight 66 carried on a rod 67 is pivotally connected at 68 to each arm 61 and insures contact of its roller 62 with its cam 63.

In the event that a can body 25 becomes mutilated or jammed, or is improperly aligned relative to the guide rails 26 and 27 so that a misshaped or projecting part strikes against an iron 56 then the particular lever involved is oscillated about its pivot 58 raising its weight 66 and permitting the passage of the can body without any resulting damage to the apparatus.

Each solder iron 56 is relatively narrow (Fig. 3) and operates in close proximity to its neighbor and the cam controlled rocking of the various irons preferably raises alternate irons while lowering those intermediate. Such an action causes less agitation of the surface of the solder since one set of waves so created counter-balances the neighboring waves. Each solder iron 56 being immersed into the solder 24 at each movement of its lever 57 always presents a clean soldering surface to the can body. An iron 56 rising from the solder 24 carries a film of solder 71 (Fig. 4) which drains back over the upper surface of the iron 56 insuring a proper quantity of solder on the contact surface of the iron. When this film of solder contacts the side seam 55 of the can body 25, just the proper amount of solder is forced by a squirting action into the side seam.

Inasmuch as the solder is placed directly where it is required the width of the contact surface of each iron 56 can be made relatively narrow insuring application of the minimum amount and width of solder to the side seam producing an ideally soldered joint.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a soldering apparatus, the combination of a solder bath, a solder horn positioned above said bath and adapted to support can bodies, a conveyor for moving the can bodies along said horn and over said solder bath, and a plurality of separate soldering irons positioned beneath said horn and having movement into engagement with a can body passing along said horn and into solder contained in the solder bath, and independent mechanisms for moving said irons separately to and from said can bodies.

2. In a soldering apparatus, the combination of a solder bath, a solder horn positioned above said bath and adapted to support can bodies, a conveyor for moving the can bodies along said horn and over said solder bath, a plurality of separately movable soldering irons positioned beneath said horn and having movement into engagement with a can body passing along said horn and into solder contained in the solder bath, and independent means for each iron for moving said soldering irons to and from said can bodies in upward and downward directions.

3. In a soldering apparatus, the combination of a solder bath, a solder horn positioned above said bath and adapted to support can bodies with their side seams at the bottom of the horn, a conveyor for moving the can bodies along said horn and over said solder bath, and a plurality of soldering irons positioned beneath said horn and having movement into engagement with the side seam of a can body passing along said horn and into solder contained in the solder bath, and independent means for each iron for moving said irons up and down to and from said bodies.

4. In a soldering apparatus, the combination of a solder bath, a solder horn positioned above said bath and adapted to support can bodies, a conveyor for moving the can bodies along said horn and over said solder bath, and a plurality of soldering irons pivotally mounted on the side of the solder bath and having up and down movement between the solder within the solder bath and the can body passing along said horn.

5. In a soldering apparatus, the combination of a solder bath, a solder horn positioned above said bath and adapted to support can bodies, a conveyor for moving the can bodies along said horn and over said solder bath, a plurality of soldering irons pivotally mounted exteriorly to the solder bath and having up and down movement between the solder within the solder bath and the can body passing along said horn, and means for effecting such up and down movement.

6. In a soldering apparatus, the combination of a solder bath, a solder horn positioned above said bath and adapted to support can bodies, a conveyor for moving the can bodies along said horn and over said solder bath, a plurality of soldering irons positioned beneath said horn, levers pivotally mounted on the side of the solder bath and carrying the soldering irons, and cam means for rocking the levers about their pivots to raise their soldering irons into engagement with the passing can bodies.

7. A soldering apparatus comprising in combination, a solder bath, a solder horn positioned above said bath and adapted to support can bodies, a conveyor for moving the can bodies along the axis of the horn, and a plurality of soldering irons positioned beneath said horn arranged and having movement at right angles to the axis thereof for receiving solder from the solder bath and applying it to said can bodies as they are conveyed along said horn, and means for moving said irons up and down to and from said bodies.

8. A soldering apparatus comprising in combination, a solder bath, a solder horn positioned above said bath and adapted to support can bodies, a conveyor for moving the can bodies along the axis of the horn, a plurality of soldering irons positioned beneath said horn and lying closely adjacent each other, the collective soldering irons extending along a line parallel to the axis of the horn, said irons having individual vertical movement, and means for lifting each iron in proper time with the passing can body to apply solder thereto.

9. In a soldering apparatus, the combination of, a solder bath, a solder horn positioned above said bath and adapted to support can bodies, a conveyor for moving the can bodies along said horn and over said solder bath, a plurality of soldering irons positioned beneath said horn, a supporting shaft carried near said solder bath, a plurality of levers mounted side by side and having pivotal connection with said shaft, each lever carrying a said soldering iron, and means for individually rocking said levers about said shaft to raise each soldering iron into soldering position relative to the passing can body.

10. In a soldering apparatus, the combination of a solder bath, a solder horn positioned above said bath and adapted to support can bodies, a conveyor for moving the can bodies along said horn and over said solder bath, a soldering iron immersible in the solder of said bath and having movement on an axis extending parallel to said horn for engaging a can body passing along said horn, and means for moving said iron to and downward from said bodies.

JOHN F. PETERS.